(12) United States Patent
Rivera

(10) Patent No.: US 11,639,189 B2
(45) Date of Patent: May 2, 2023

(54) FLATBED UTILITY CART

(71) Applicant: Luis Daniel Rivera, Fleming Island, FL (US)

(72) Inventor: Luis Daniel Rivera, Fleming Island, FL (US)

( * ) Notice: Subject to any disclaimer, the term of this patent is extended or adjusted under 35 U.S.C. 154(b) by 355 days.

(21) Appl. No.: 17/069,585

(22) Filed: Oct. 13, 2020

(65) Prior Publication Data

US 2021/0107547 A1   Apr. 15, 2021

Related U.S. Application Data

(60) Provisional application No. 62/914,580, filed on Oct. 14, 2019.

(51) Int. Cl.
| | | |
|---|---|---|
| *B62B 1/20* | (2006.01) | |
| *B62B 1/00* | (2006.01) | |
| *B62B 3/02* | (2006.01) | |
| *B62B 5/00* | (2006.01) | |
| *B62B 5/06* | (2006.01) | |
| *B62B 3/04* | (2006.01) | |

(52) U.S. Cl.
CPC .............. *B62B 1/20* (2013.01); *B62B 1/008* (2013.01); *B62B 3/02* (2013.01); *B62B 5/00* (2013.01); *B62B 5/06* (2013.01); *B62B 3/04* (2013.01)

(58) Field of Classification Search
CPC .. B62B 1/20; B62B 1/008; B62B 3/02; B62B 3/04; B62B 5/00; B62B 5/06
See application file for complete search history.

(56) References Cited

U.S. PATENT DOCUMENTS

| | | | |
|---|---|---|---|
| 1,716,611 A | | 6/1929 | Wilson |
| 4,165,088 A | * | 8/1979 | Nelson ................... B62B 3/02 |
| | | | 280/47.35 |
| 4,221,524 A | * | 9/1980 | Morris ................ A63B 47/021 |
| | | | 414/439 |
| 4,705,280 A | | 11/1987 | Burns |
| 5,328,192 A | | 7/1994 | Thompson |
| 6,685,200 B1 | | 2/2004 | Giannoni |
| D532,176 S | | 11/2006 | Ditmars |

(Continued)

FOREIGN PATENT DOCUMENTS

| | | |
|---|---|---|
| CN | 204801827 U | 11/2015 |
| CN | 206427080 U | 8/2017 |

OTHER PUBLICATIONS

EPO—Invitation to Pay Additional Fees and, Where Applicable, Protest Fee—in related International Application No. PCT/US2020/055384, dated Dec. 22, 2020; 11 pgs.

*Primary Examiner* — Bryan A Evans
(74) *Attorney, Agent, or Firm* — McDermott Will & Emery LLP

(57) ABSTRACT

A utility cart including a rectangular base is provided. The utility cart includes at least one handle extending outward and upwards from a short side of the rectangular base and a leg extending down from the short side of the rectangular base on the short side of the handles. The utility cart also includes a first wheel assembly joined to the rectangular base on end opposite to the handles, wherein two wheels and the leg are positioned such that the rectangular base is horizontal with a floor, two holes centered along each long side of the rectangular base, and a first adjustable guard that fits into the two holes.

19 Claims, 15 Drawing Sheets

(56) References Cited

U.S. PATENT DOCUMENTS

| | | | |
|---|---|---|---|
| 2002/0113388 A1* | 8/2002 | Robinson | B62B 1/20 |
| | | | 280/47.31 |
| 2003/0193156 A1 | 10/2003 | Norris | |
| 2018/0186567 A1* | 7/2018 | Crowley, Jr. | B62B 5/0006 |
| 2020/0039552 A1* | 2/2020 | Trebtoske | B62B 5/067 |

* cited by examiner

FLATBED UTILITY CART

CROSS-REFERENCE TO RELATED APPLICATIONS

The present disclosure is related and claims priority under 35 U.S.C. § 119(e) to U.S. Provisional Patent Application No. 62/914,580, entitled FLATBED UTILITY CART, to Rivera, filed on Oct. 14, 2019, the contents of which are hereinafter incorporated by reference in their entirety, for all purposes.

BACKGROUND

Field

The present disclosure relates to a utility cart. More particularly, the present disclosure relates to an adjustable flatbed utility cart for simple and efficient transportation of variable amounts of goods with varying sizes, which, compared to conventional flatbed utility cart designs, exhibits reduced injury to the user and bystanders, particularly in crowds.

Related Art

Flatbed utility carts are used in a variety of applications (e.g., industrial, commercial, retail, etc.) to assist with the efficient transportation of goods, including goods that an individual is unable to physically or safely carry alone. Conventional flatbed utility carts typically include at least one horizontally positioned surface (e.g., shelf), four elongated legs or posts, and a plurality of wheels attached to the underside of a base. Variations on this conventional configuration exist, and include differing heights, handles, wheels, and load size. However, due to dimensional discrepancies between the cart designs and the user, conventional utility carts present hazards and challenges for the user, such as back injuries and the inability of traversing stairways, uneven pavements, and loading area docks, carrying a load that remains stable on the cart.

SUMMARY OF THE DISCLOSURE

A primary objective of the present disclosure is to provide a utility cart with handles allowing for the operator to stand fully upright, i.e., not bent at the legs, knees, or back, which overcomes the issues of conventional flatbed utility carts, which are prone to cause injury to the user, particularly associated with pushing, pulling, and otherwise maneuvering said carts due to height discrepancy between the cart and user, as well as injury to bystanders when transporting goods in crowds (e.g., airports, stadiums, arenas, and convention centers).

An objective is to provide a utility cart with broad load security, e.g., adjustable guards and shelving, that is capable of accommodating goods of varying amounts and sizes, as well as irregular shapes, uneven weight distributions, and combinations thereof.

An object of the disclosure is to provide compartments, including adjustable compartments, for organization of deliveries.

An object of the disclosure is to provide the capability of being used to traverse one or more stairs and other inclines, or uneven surfaces and loading docks.

An object of the disclosure is to provide legs that will be stain and scratch resistant to floors.

The objects of the present disclosure are not limited to the foregoing. In addition, further objects of the disclosure continue to be described herein.

In one embodiment, a utility cart includes a rectangular base, at least one handle extending outward and upwards from a short side of the rectangular base, and a leg extending down from the short side of the rectangular base on the short side of the handles. The utility cart also includes a first wheel assembly joined to the rectangular base on end opposite to the handles. Two wheels and the leg are positioned such that the rectangular base is horizontal with a floor. In some embodiments, the utility cart may include two additional swivel casters (wheels) to enable maneuverability and steering. The utility cart also includes two holes centered along each long side of the rectangular base and a first adjustable guard that fits into the two holes.

In one embodiment, a flatbed cart includes a frame to support a planar sheet and a first wheel assembly attached to the frame. The first wheel assembly includes an axle, two wheels attached to the axle, and an axle support having an arcuate shape with a concavity pointing down, wherein the axle support is fixed to the frame in two extremities and the axle is attached to the axle support at a low point in the concavity. The flatbed cart also includes a handle attached to the frame, the handle curved upward from the planar sheet, and a spacer attached to the frame opposite the handle. The first wheel assembly includes a fulcrum when a carrier lifts the handle and a load is placed on the planar sheet, and the spacer provides a horizontal disposition of the planar sheet when the carrier releases the handle.

To the accomplishment of the above and related objects, this disclosure may be embodied in the form illustrated in the accompanying drawings, attention being called to the fact, however, that the drawings are illustrative only, and that changes may be made in the specific construction illustrated and described within the scope of the appended claims.

DETAILED DESCRIPTION OF THE DISCLOSURE

Despite their routine usage, conventional utility carts still present hazards. For example, common injuries from pushing, pulling, and otherwise maneuvering conventional utility carts include straining of the lower back, shoulder, and arm muscles. This is also sometimes due in part to height discrepancy between the cart and user. In addition, conventional utility carts typically lack maneuverability and have been known to cause injury to bystanders when transporting goods in crowds (e.g., airports, stadiums, arenas, and convention centers) where they are often used. Similarly, they cannot be used to traverse stairways.

Additionally, conventional utility carts have limited breadth of load security, particularly in serial transport of goods of varying amounts and sizes, irregular shapes, uneven weight distributions, and combinations thereof.

However, there is no existing utility cart that provides the user with full upright control and broad load security for the efficient transportation of goods, or that is able to overcome the other limitations associated with conventional flatbed carts.

Accordingly, it would be advantageous for a utility cart that provides full upright control to overcome injuries commonly associated with conventional utility carts, as well as broad load security for simple and efficient transportation of goods, including goods of varying amounts and sizes, irregular shapes, uneven weight distributions, and combinations thereof.

Figure 1A:
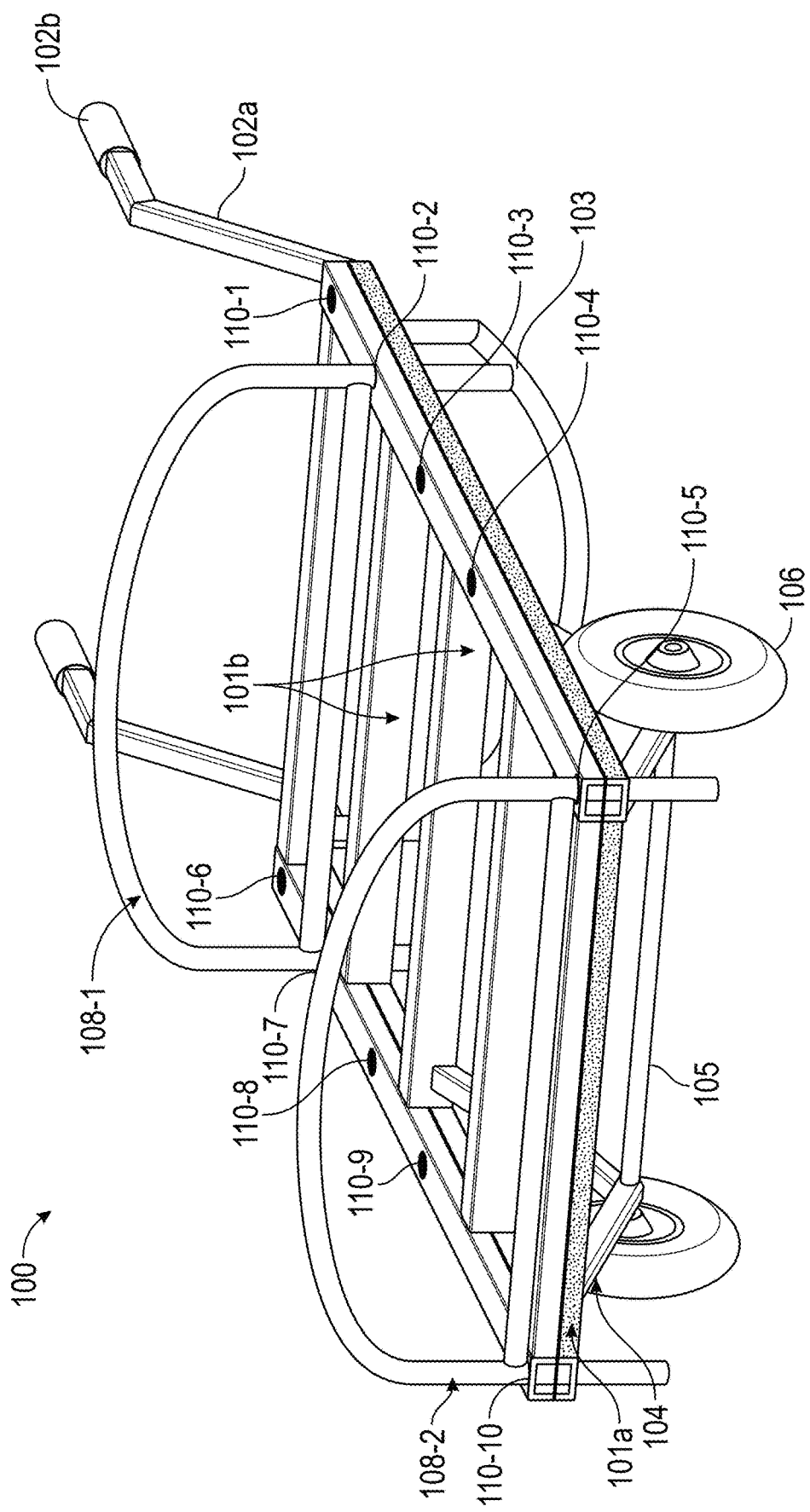
FIGS. 1A-B are a perspective view and a top view of an embodiment of a utility cart, according to some embodiments.
Figure 1B:
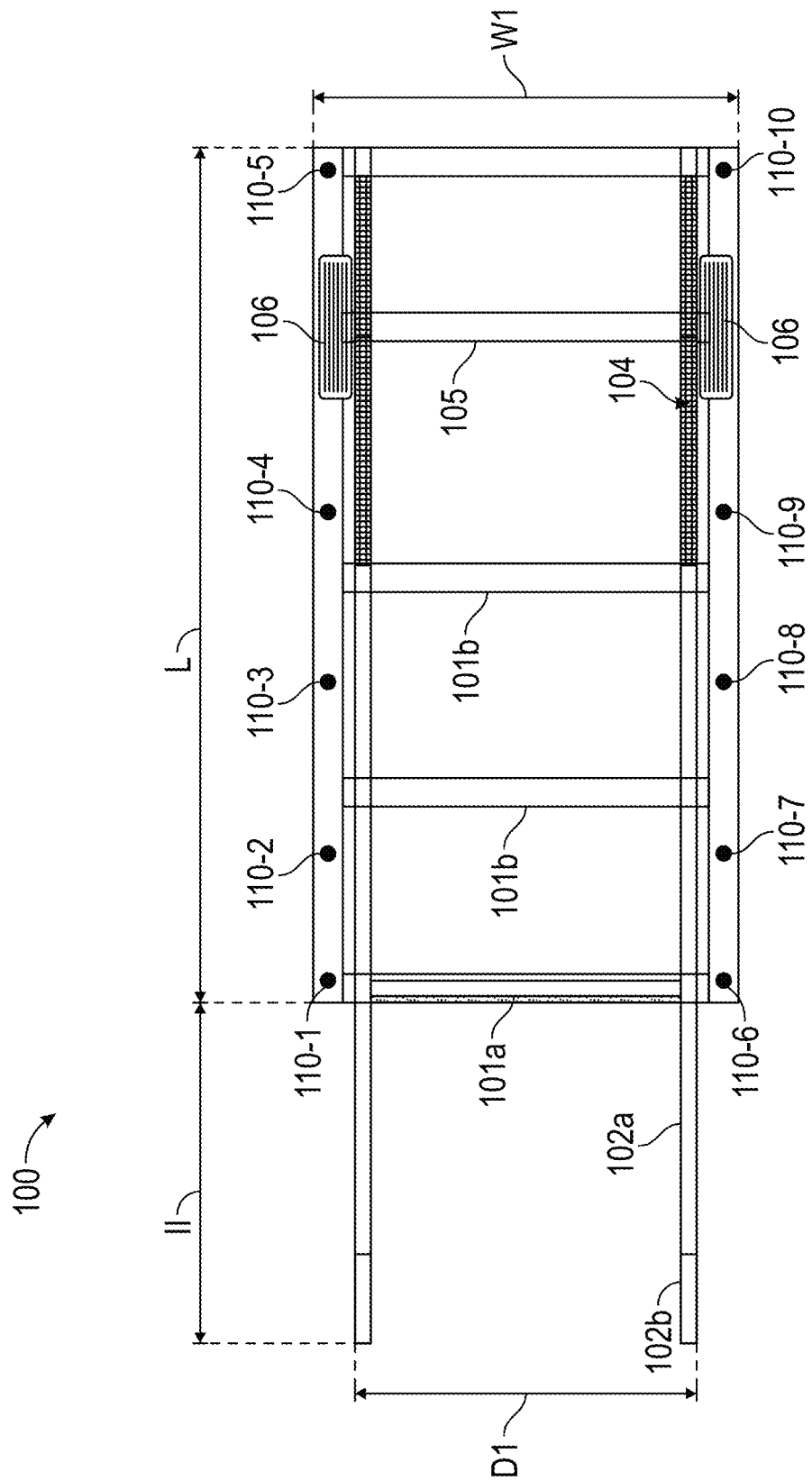

FIGS. 1A-B are a perspective view and a top view of a utility cart 100, according to some embodiments. Utility cart 100 may be referred to as a "flatbed" utility cart, without limitation of the different embodiments described herein.

FIG. 1A illustrates a perspective view of an embodiment of utility cart 100 from the top. In this embodiment, utility cart 100 includes a hollow rectangular base 101a and three equidistant support beams 101b spanning the width perpendicular to the long sides of said rectangular base 101a. Utility cart 100 also includes two handles 102a extending outward and upward from the underside of one shorter side of said rectangular base 101a. A handle grip 102b is attached at the end of each handle 102a, to enable a user to lift and carry utility cart 100. In some embodiments, handles 102a have a shape that is curved upward to a height that is anatomically convenient for a user to reach handle grip 102b without having to bend their knees, or maintain their elbows bent while pushing or pulling utility cart 100.

In some embodiments, a curved leg 103 extends downward from the corners of the same shorter side of rectangular base 101a as handles 102a (e.g., from the opposite side or "bottom" of rectangular base 101a). In some embodiments, leg 103 is a curved tube extending from one of the long sides of the rectangular base 101a to another of the long sides of rectangular base 101a, leg 103 having a concavity pointing downward from rectangular base 101a.

A wheel assembly 104 extends downward from said rectangular base 101a on the opposite side of handles 102a. Wheel assembly 104 is attached on a first end to the opposite sides of one of support beams 101b and to the short side of said rectangular base 101a (opposite of the handles 102a) on a second end. An axle 105 connects two wheels 106 to the outside of wheel assembly 104.

In some embodiments, rectangular base 101a may include multiple paired circular holes 110-1, 110-2, 110-3, 110-4, 110-5, 110-6, and 110-7 (hereinafter, collectively referred to as "holes 110") centered along each long side of said rectangular base 101a, where two holes are positioned at each corner and the remaining additional holes are arranged between adjacent support beams 101b. In some embodiments, and without any limitation, holes 110 may include at least one or more circularly shaped holes. In some embodiments, one or more adjustable guards 108-1 and 108-2 (hereinafter, collectively referred to as "adjustable guards 108") fit into opposing paired holes 110 along each long side of said rectangular base 101a.

In some embodiments, two pairs of holes 110 are positioned at the corners of rectangular base 101a. A first pair of holes 110, namely 110-1 and 110-6, is positioned between the short end adjacent to handles 102a and support beam 101b. Two additional holes 110-3 (110-8) and 110-4 (110-9) are placed between adjacent support beams 101b. In general, adjustable guards 108 fit any one of the paired holes 110. A second adjustable guard 108-2 fits into a second paired set of holes 110-5 and 110-10, along each long side of rectangular base 101a.

More generally, multiple adjustable guards 108 fit into multiple pair sets of holes 110 along each long side of rectangular base 101a, forming two or more compartments on rectangular base 101a to carry items on the utility cart. While reference has been made to a "rectangular base" 101a, it is understood that the particular shape of base 101a is not limiting of embodiments consistent with the present disclosure. For example, in some embodiments, base 101a may have a triangular shape, a square shape, a hexagonal shape, octagonal shape, and the like. Moreover, in some embodiments, base 101a may have an irregular shape (e.g., a diamond shape, rhomboidal shape, trapezoidal shape, and the like).

FIG. 1B is a top view of utility cart 100, according to some embodiments. Holes 110 are visible on rectangular base 101a, in addition to support beams 101b, axle 105, and wheel assembly 104. Wheels 106 are also visible. Without loss of generality, utility cart 100 has some dimensions that make it simple to manipulate without injuring the carrier or any other person. For example, the distance, D1, between the two handles 102a may be approximately 24 inches, somewhat more or somewhat less. The length, ll, of the two handles may be about twenty-four (24) inches. The width, W1 of utility cart 100 may be 30 inches, and holes 110 may be rounded holes configured to receive one (1) inch tubes throughout. In some embodiments, holes 110 may be centered along each long side of the rectangular base and may be formed in any shape, number, or arrangement suitable to the needs of the user.

In some embodiments, hole 110-1, 110-5, 110-6, or 110-10 may be at about one (1) inch distance from the edge of rectangular base 101a. Rectangular base 101a may include two (2) inch thick bars (e.g., 2×2 box tube aluminum). The long side, L, of rectangular base 101a may be sixty (60) inches or more. The dimensions provided herein may be variable according to a desired design, and the cost may be afforded by the owner. A beam, supporting axle 105 in wheel assembly 104, may be one (1) inch thick. Wheel 106 may be positioned about eight and a half (8.5) inches from the short side (e.g., back end) of utility cart 100.

Figure 2:
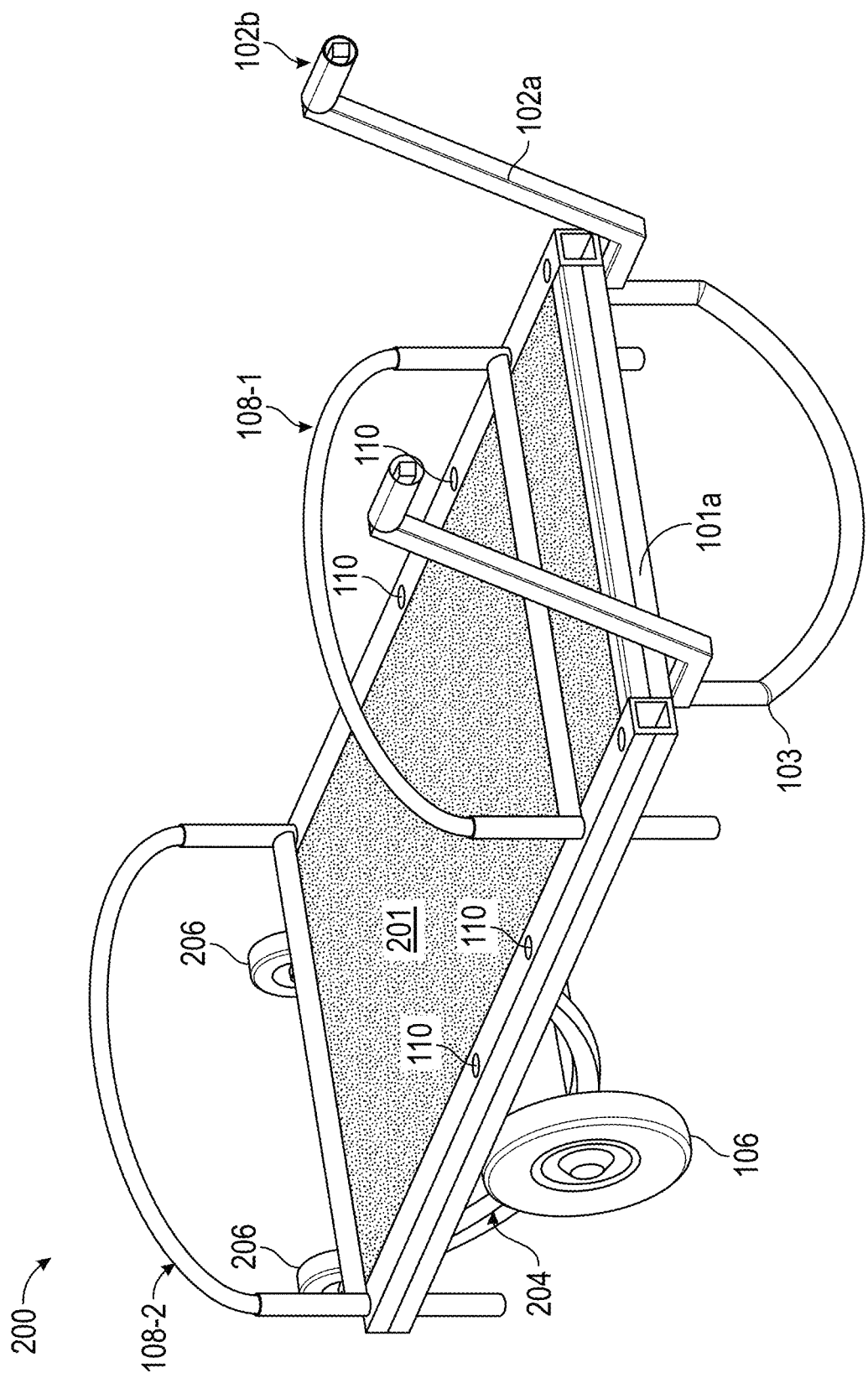
FIG. 2 is a perspective view of an embodiment of a utility cart including a baseboard, according to some embodiments.

FIG. 2 is a perspective view of an embodiment of utility cart 200 including a baseboard 201, according to some embodiments. In some embodiments, baseboard 201 is fitted on rectangular base 101a. Baseboard 201 is configured to receive one or more items for transport on utility cart 200. Adjustable guards 108, which fit into opposing paired circular holes 110 along each long side of said rectangular base 101a, may then be used to create three or more separate compartments for different recyclable goods (e.g., paper, plastic, and glass). In some embodiments, the compartments may be enclosed and/or be fitted with an opening into which the recyclable goods may be inserted. Adjustable guards 108, which fit into opposing paired circular holes 110 along each long side of said rectangular base 101a, may then be used to create three or more separate compartments to suit janitorial needs (trash compartment, paper recycler, compartments, and drawer for keeping supplies).

In some embodiments, utility cart 200 includes a second wheel assembly with wheels 206, extending from one of the short sides (e.g., back-end) in a perpendicular direction relative to a first wheel assembly 204. Accordingly, utility cart 200 may enable a carrier to transport items either ascending or descending a stairway, or going through uneven pavements and loading docks. Handle 102a, handle grip 102b, leg 103 and wheels 106 are as described above in reference to utility cart 100.

Figure 3A:
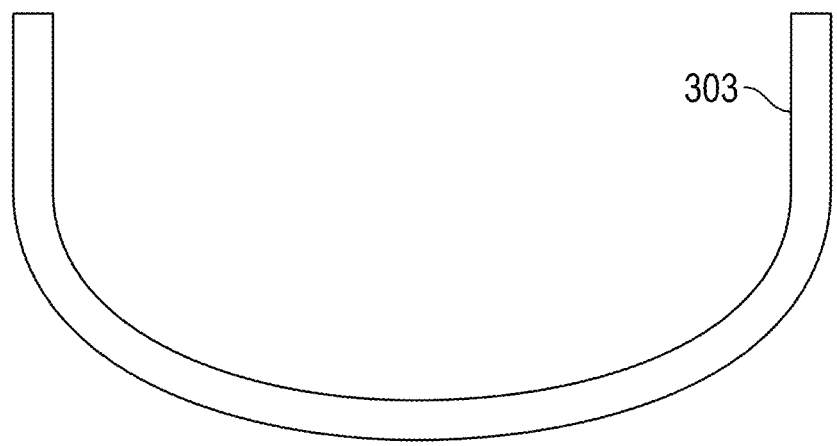
FIGS. 3A-B illustrate accessories for a utility cart, according to some embodiments.
Figure 3B:
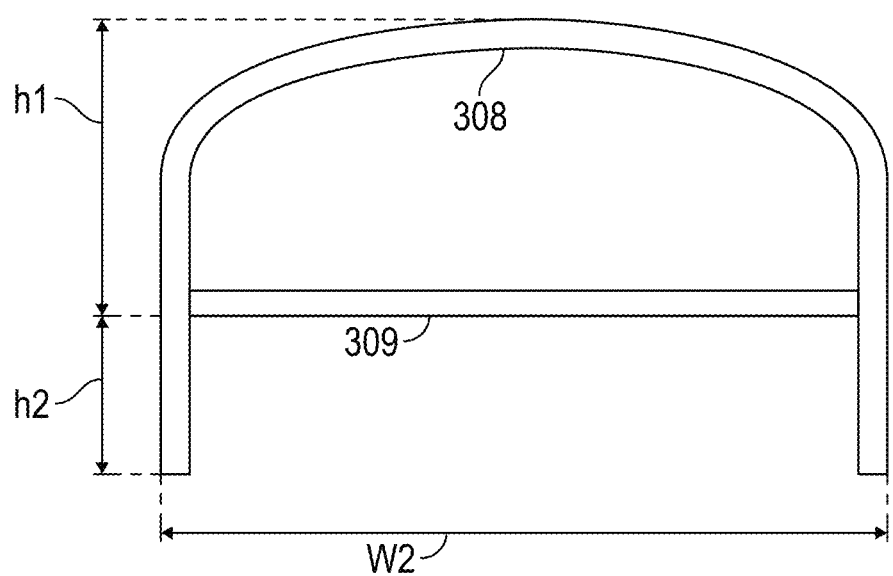

FIGS. 3A-B illustrate accessories for a utility cart, according to some embodiments.

FIG. 3A illustrates a leg, or spacer 303. In some embodiments, leg 303 is a one (1) inch round tube. In some embodiments, leg 303 is a curved tube extending from one of the long sides of the rectangular base of the utility cart to another of the long sides of the rectangular base of the utility cart, and having a concavity pointing downward from the rectangular base of the utility cart. In some embodiments, leg 303 is a spacer attached to the frame opposite the handle, wherein the wheel assembly acts as a fulcrum when a carrier lifts the handle and a load is placed on the planar sheet, and the spacer provides a horizontal disposition of the planar sheet when the carrier releases the handle.

FIG. 3B illustrates an adjustable guard 308 including a frame having two extremities such that each extremity is inserted in each of two circular holes in the rectangular base of the utility cart (e.g., holes 110). In some embodiments, adjustable guard 308 includes a one (1) inch diameter round tube. In some embodiments, adjustable guard 308 includes a bar 309 joining the two extremities at a point of insertion into the two circular holes. Adjustable guard 308 has a width W2 consistent with a width of the utility cart (e.g., width W1). For example, in some embodiments, width W2 may be about twenty four (24) inches, or the like.

Bar 309 separates adjustable guard 308 into two portions having different heights h1 and h2. In some embodiments, and without limitation, the height h1 may be approximately twelve (12) inches, and h2 may be approximately six (6) inches.

Figure 4A:
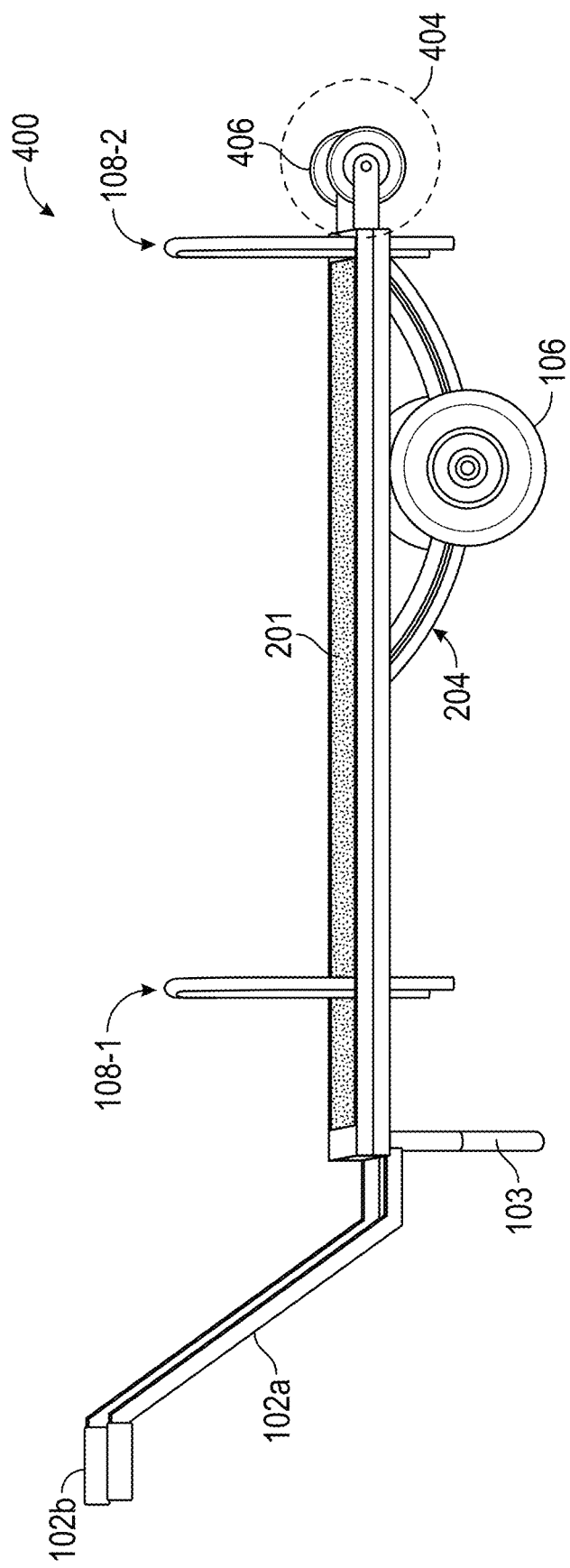
FIGS. 4A-C illustrate a utility cart having two wheel assemblies, according to some embodiments.
Figure 4B:
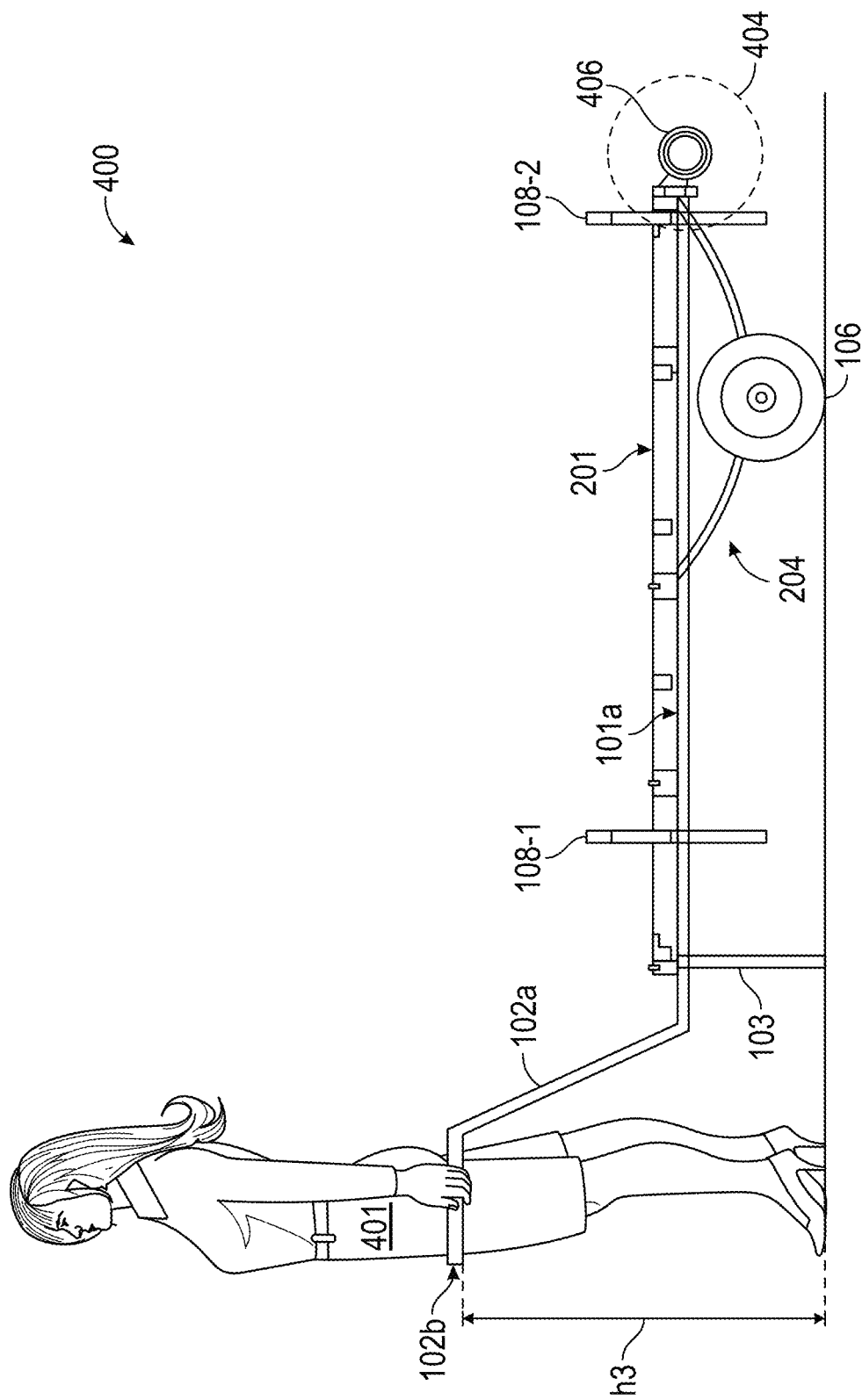

FIGS. 4A-B illustrate a utility cart 400 having two wheel assemblies 204 and 404 arranged perpendicularly relative to each other, according to some embodiments. Utility cart 400 includes handles 102a, handle grip 102b, a leg 103, adjustable guards 108, wheel assembly 204, wheel assembly 404, wheels 106, and rolling casters 406. In some embodiments, utility cart 400 includes rolling casters 406 and arms on the front of the cart to assist with climbing one or more stairs, or going through uneven surfaces or loading docks, to deliver goods.

FIG. 4A is a side view illustrating baseboard 201 and wheel assemblies 204 and 404. In some embodiments, wheel assembly 404 includes rolling casters 406. In some embodiments, wheel assembly 404 is disposed on a side of the rectangular base opposite from handles 102a (e.g., at the back-end). In some embodiments, baseboard 201 may include a one-fourth (¼) inch aluminum flat sheet, and further include textured safety mats on the top of the flat sheet.

FIG. 4B illustrates a user or carrier 401 super-imposed on utility cart 400. It is seen that at least one handle 102a is bent up a distance h3, to reach an extended arm of carrier 401 when lifting the utility cart. In some embodiments, distance h3 may be about twenty eight (28) inches or the like, so that carrier 401 can maintain a straight, or almost straight, elbow while carrying utility cart 400 while reaching handle grip 102b in handle 102a.

The posture of carrier 401 illustrates the anatomic proficiency of utility cart 400. Accordingly, carrier 401 may handle utility cart 400 in a full upright position (with minimal bending of knees or elbows), thus allowing carrier 401 to comfortably and safely carry items on utility cart 400 over sloping surfaces and stairways or steps.

Figure 4C:
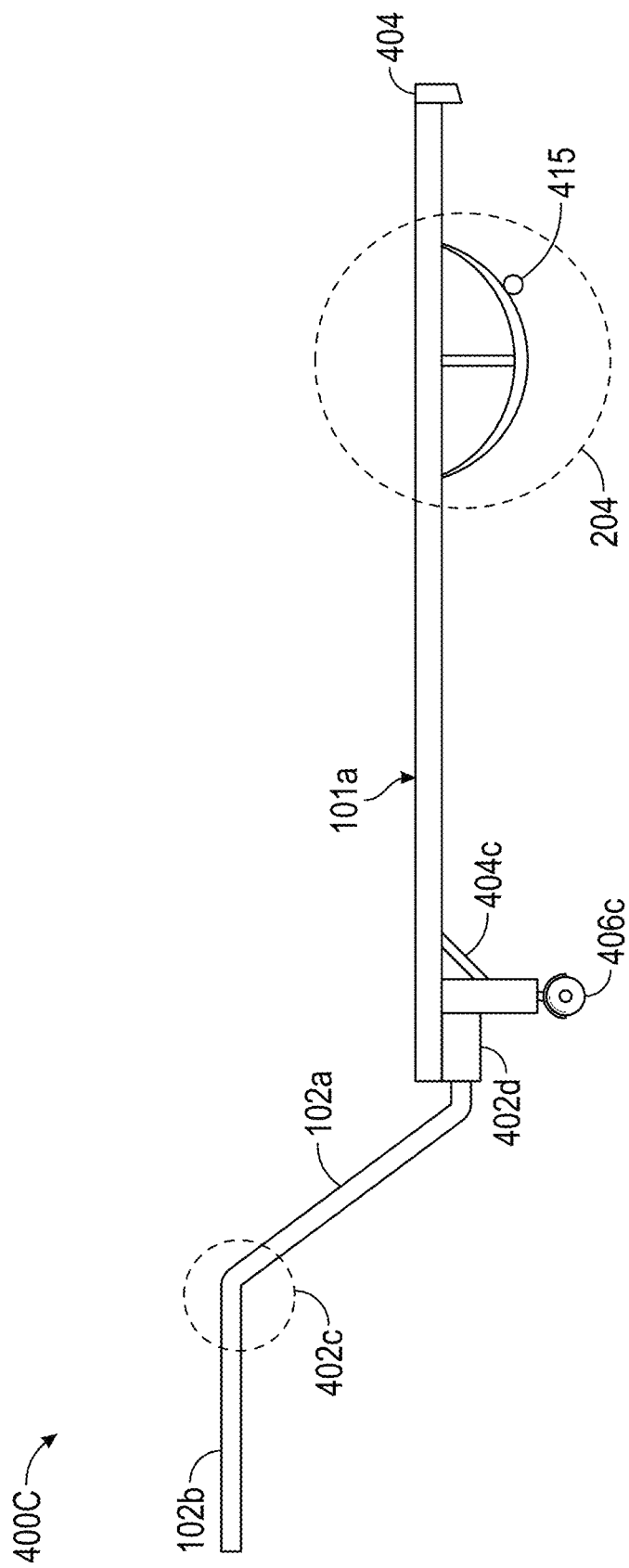

FIG. 4C illustrates a utility cart 400C having two wheel assemblies 204, 404, and 404c, according to some embodiments. Swivel caster 406c is reinforced by assembly 404c, which may be a support tube. In some embodiments, swivel casters 406c may be removable. Wheel assembly 404 may include a square, 2×4 cross-sectional tube for a caster mount.

In wheel assembly 204, a mount 415 to support the axle may include, without limitation, a 1.5 inch diameter round tubing. In some embodiments, mount 415 may be placed slightly above the lowest point in the concavity of wheel assembly 204.

Handle grip 102b is coupled to handle 102a via a rounded tubing portion 402c. In that regard, handle grip 102b, handle 102a and tubing portion 402c may include a round tubing one and a half (1.5) inches in diameter. The handle assembly is coupled to the base 101a via a handle insert 402d. In some embodiments, handle insert 402d may include two or more nuts and bolts to secure handle 102a to base 101a.

Figure 5:
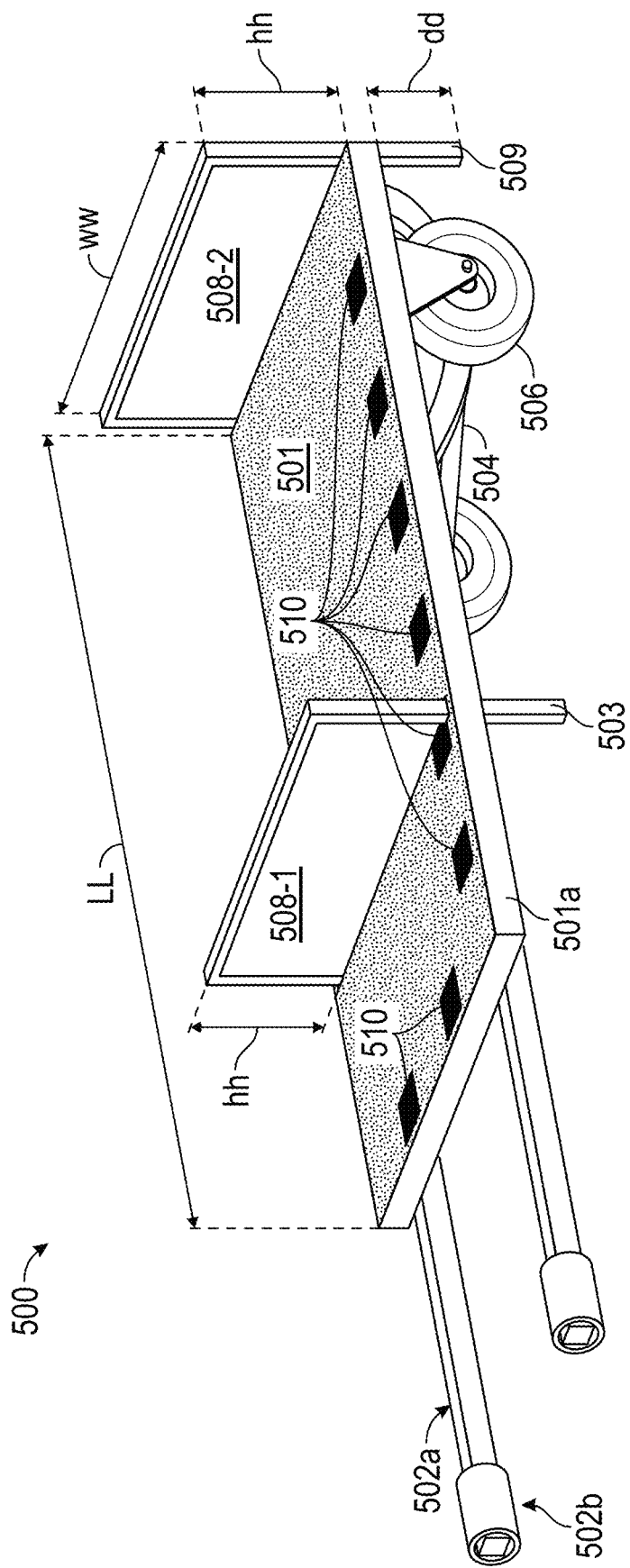
FIG. 5 illustrates a utility cart with removable and adjustable dividers to form multiple compartments, according to some embodiments.

FIG. 5 illustrates a flatbed cart 500 with removable and adjustable dividers 508-1 and 508-2 (hereinafter, collectively referred to as "dividers 508") to form multiple compartments, according to some embodiments. Flatbed cart 500 includes a frame 501a that supports a planar sheet 501 (cf. baseboard 201), and a wheel assembly 504 attached to frame 501a. A handle 502a attached to frame 501a protrudes in front of planar sheet 501. A spacer 503 is attached to frame 501a opposite handle 502a. In some embodiments, wheel assembly 504 includes a fulcrum when a carrier lifts handle 502a and a load is placed on planar sheet 501, and spacer 503 provides a resting support for a horizontal disposition of planar sheet 501 when the carrier releases handle 502a.

In some embodiments, divider 508-2 at one end of utility cart 500 may be a latch door, to facilitate easy dumping of the items on flatbed cart 500. Flatbed cart 500 also includes multiple holes 510 to select the positioning of dividers 508. A handle 502a and a handle grip 502b enable the lifting and carrying of flatbed cart 500, and a spacer 503 maintains a horizontal level of a baseboard 501 when flatbed cart 500 is at rest. In some embodiments, handle 502a may be about one (1) or two (2) feet long, and spacer 503 may be about one (1) foot long. A wheel assembly 504 including wheels 506 complete utility cart 500.

In some embodiments, dividers 508 may stand by a height, hh, of about one (1) foot tall over planar sheet 501, and have a width, ww, of about two and a half (2.5) feet. The overall length, LL, of utility cart 500 may be about five (5) feet. In some embodiments, dividers 508 may include prongs 509 that fit through holes 510 and set divider 508 on utility cart 500. In some embodiments, the length of prongs 509 may be a few inches, e.g., greater than about six (6) inches or so, but shorter than the height of wheel assembly 504.

Figure 6A:
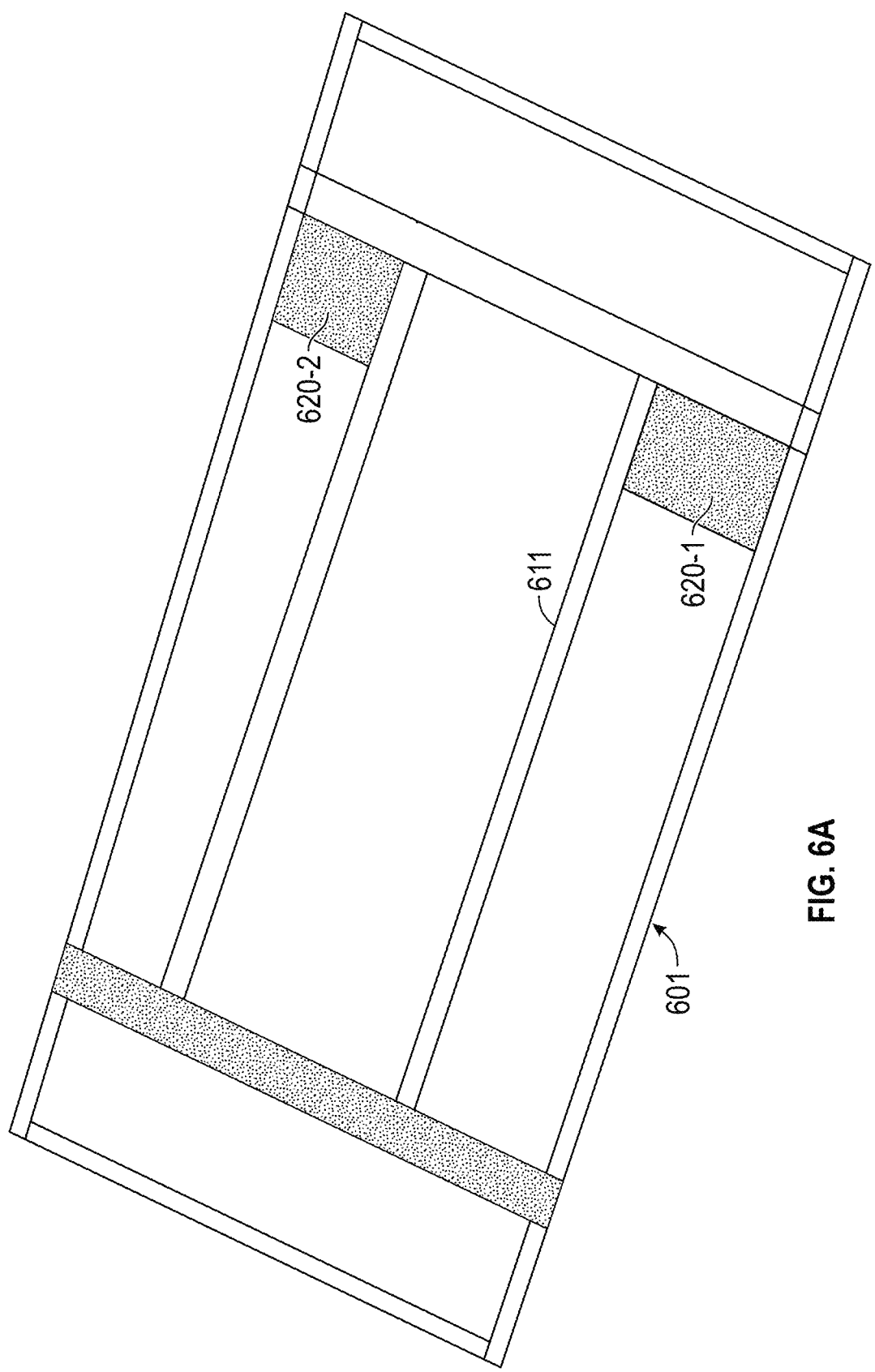
FIGS. 6A-B illustrate a bottom frame for a utility cart, according to some embodiments.
Figure 6B:
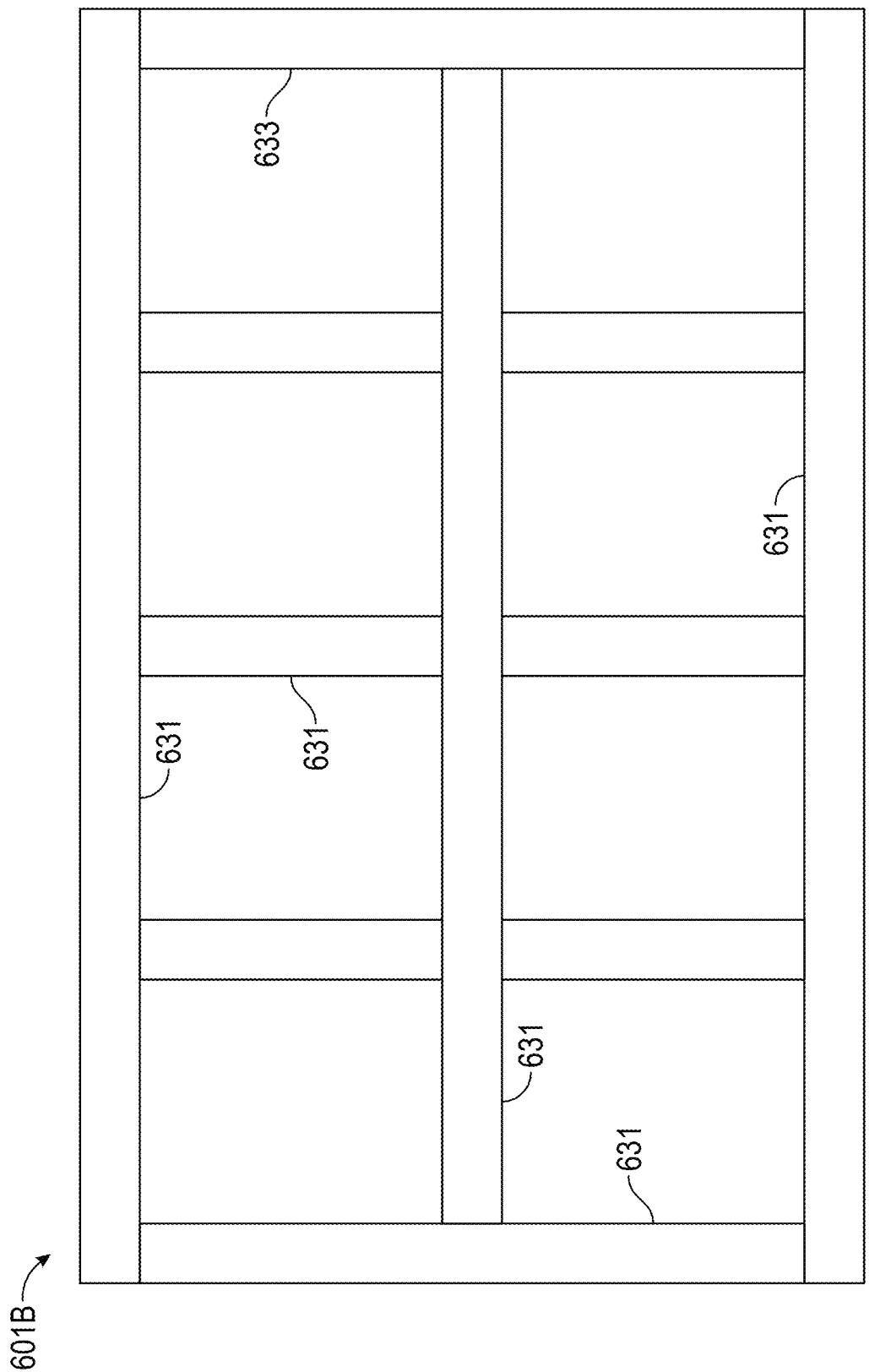

FIGS. 6A-B illustrate bottom frames 601A and 601B (hereinafter, collectively referred to as "bottom frames 601") for a utility cart, according to some embodiments.

FIG. 6A illustrates bottom frame 601A including an aluminum beam 611, and wheel mounts 620-1 and 620-2 (hereinafter, collectively referred to as "wheel mounts 620").

FIG. 6B illustrates bottom frame 601B showing a grid of aluminum tubing. The aluminum tubing in bottom frame 601B may have different cross sections in different parts. For example, a first cross section 631 along the sides and crossbars may be different from a cross section 633 in the back/front end of the cart (e.g., along one or both of the short sides of a rectangular frame). For example, and without limitation, cross section 631 may be a square, 2×2 inch tubing, and cross section 633 may be a square 4×2 inch tubing.

FIGS. 7A-F illustrate multiple views of a utility cart 700, according to some embodiments. Utility cart 700 includes a base 701a supporting a baseboard 701, and a wheel assembly 104 including wheel 106, handle 102a, handle grip 102b, and adjustable guards 108.

Figure 7A:
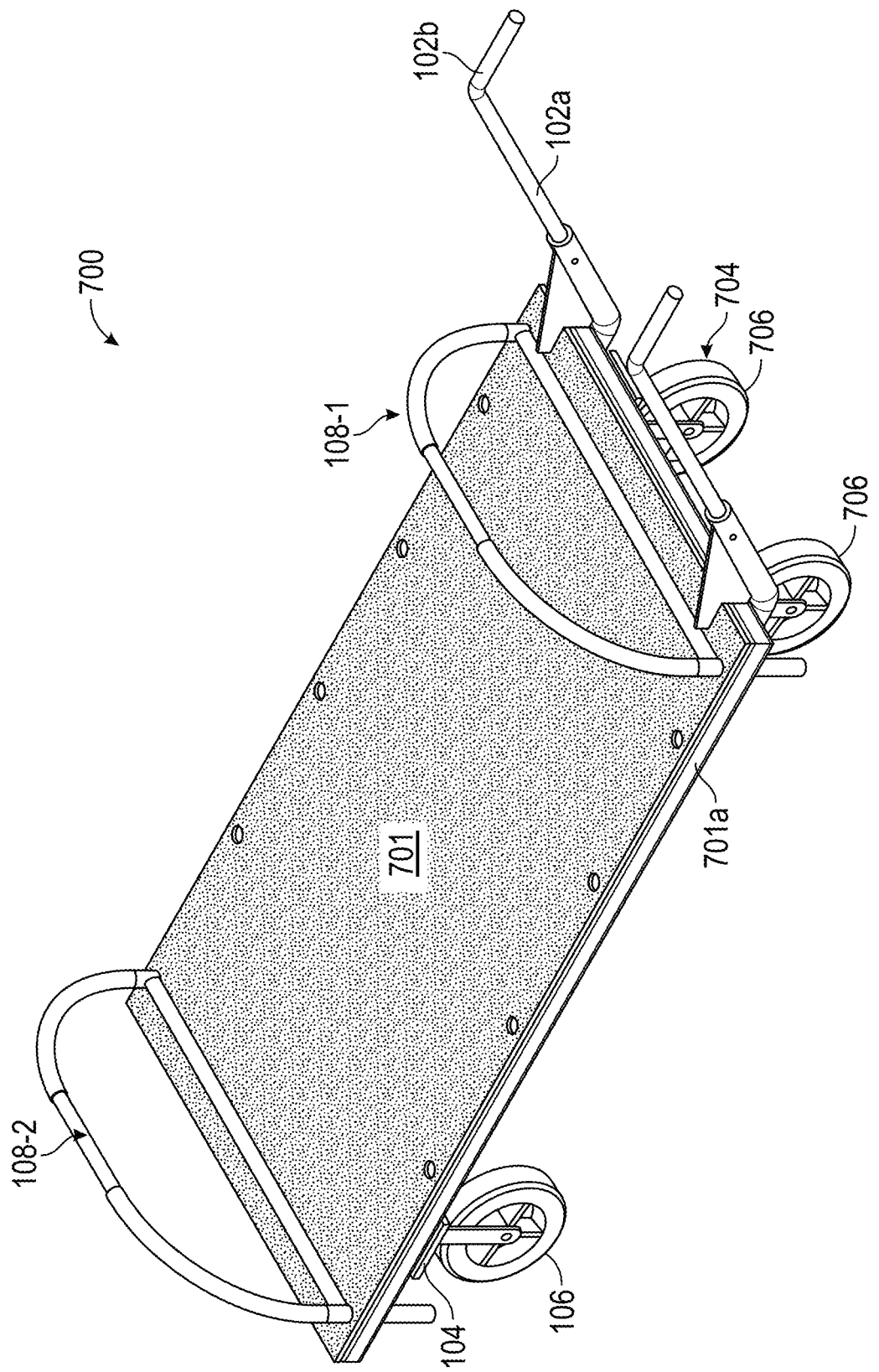
FIGS. 7A-F illustrate multiple views of a utility cart, according to some embodiments.

FIG. 7A illustrates a second wheel assembly 704 having a narrower axis than wheel assembly 104. In some embodiments, wheel assembly 704 includes two steerable wheels 706. In some embodiments, steerable wheels 706 may be removable.

Figure 7B:
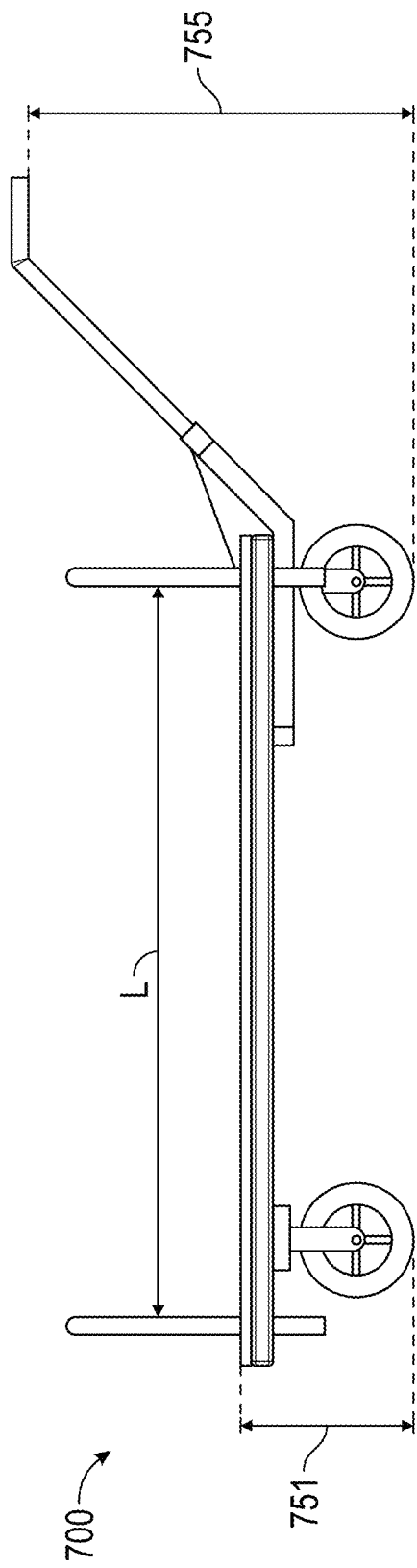

FIG. 7B is a side view of utility cart 700, illustrating a base height 751 and a handle height 755. Accordingly, wheel assemblies 104 and 704 are configured such that baseboard 701 is substantially horizontal. Also, handle height 755 is such that it facilitates the carrying of utility cart 700 by a carrier (e.g., carrier 401).

In embodiments of the disclosure, utility cart 700 may be about 48 inches in length (e.g., L) with a height 755 of about twenty four (24) inches. In embodiments of the disclosure, the utility cart of the present disclosure may be about 48 inches in length and 30 inches in height. In embodiments of the disclosure, utility cart 700 may be about 60 inches in length (L) and about 30 inches in height 755. In embodiments of the disclosure, utility cart 700 may be about 56 inches in length (L) and 45 inches in height 755. Those skilled in the art will appreciate that the utility cart of the present disclosure is not limited to the specific dimensions described herein and that the objectives of the disclosure may be accomplished through other dimensions not specifically described herein.

Figure 7C:
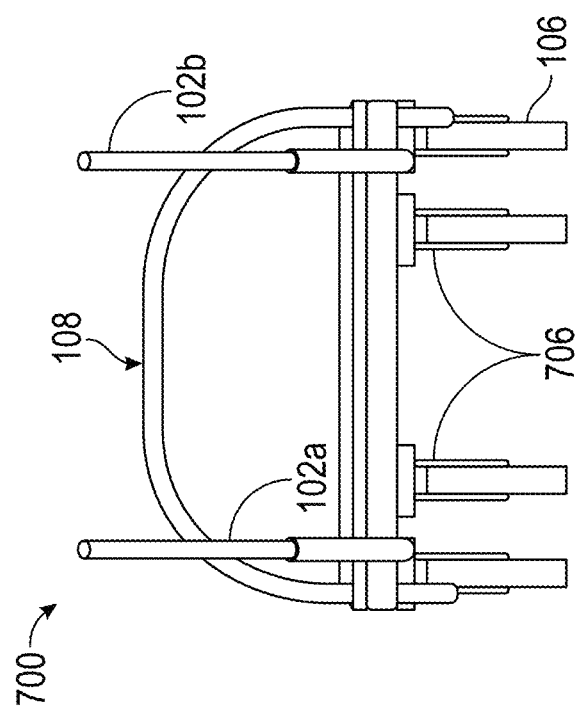

FIG. 7C illustrates a rear view of utility cart 700 showing handles 102a, handle grips 102b, and adjustable guards 108. It is seen that wheels 706 in wheel assembly 704 are closer together than wheels 106 in wheel assembly 104.

Figure 7D:
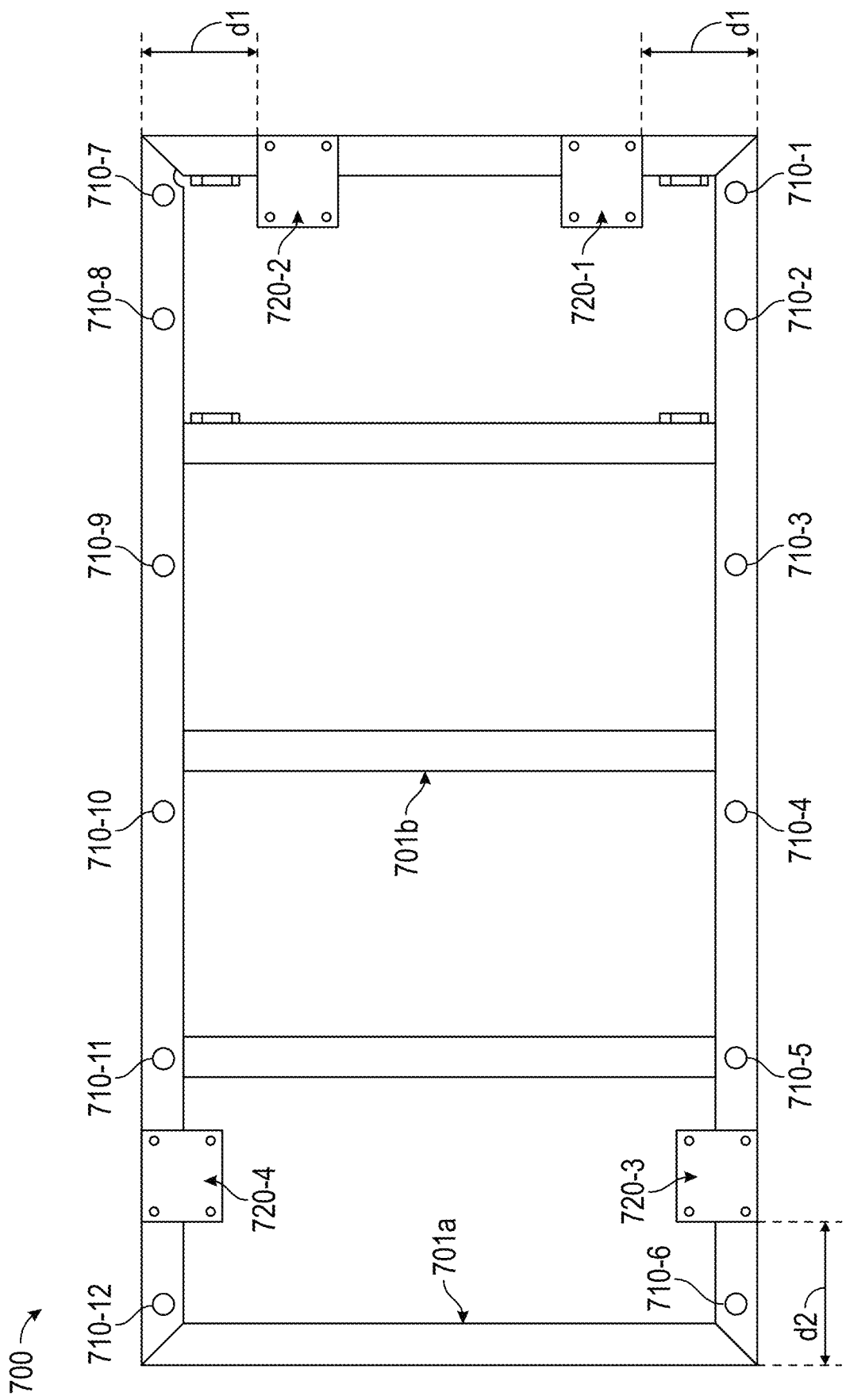

FIG. 7D is a top view of utility cart 700. A base 701a is reinforced by support beams 701b. Holes 710-1, 710-2, 710-3, 710-4, 710-5, 710-6, 710-7, 710-8, 710-9, 710-10, 710-11, and 710-12 (hereinafter, collectively referred to as "holes 710") allow the positioning of adjustable guards 108 in multiple locations along base 701a. Wheel plates 720-1 and 720-2 form part of wheel assembly 104, and wheel plates 720-3 and 720-4 form part of wheel assembly 704. Wheel plates 720-1 through 720-4 will be collectively referred to, hereinafter, as "wheel plates 720."

A distance d1 separating wheel plates 720-1 and 720-2 from the long edges of base 701a may be about five and a half (5.5) in. A distance d2 separating plates 720-3 and 720-4 from the short edge of base 701a may be about seven (7) inches.

Figure 7E:
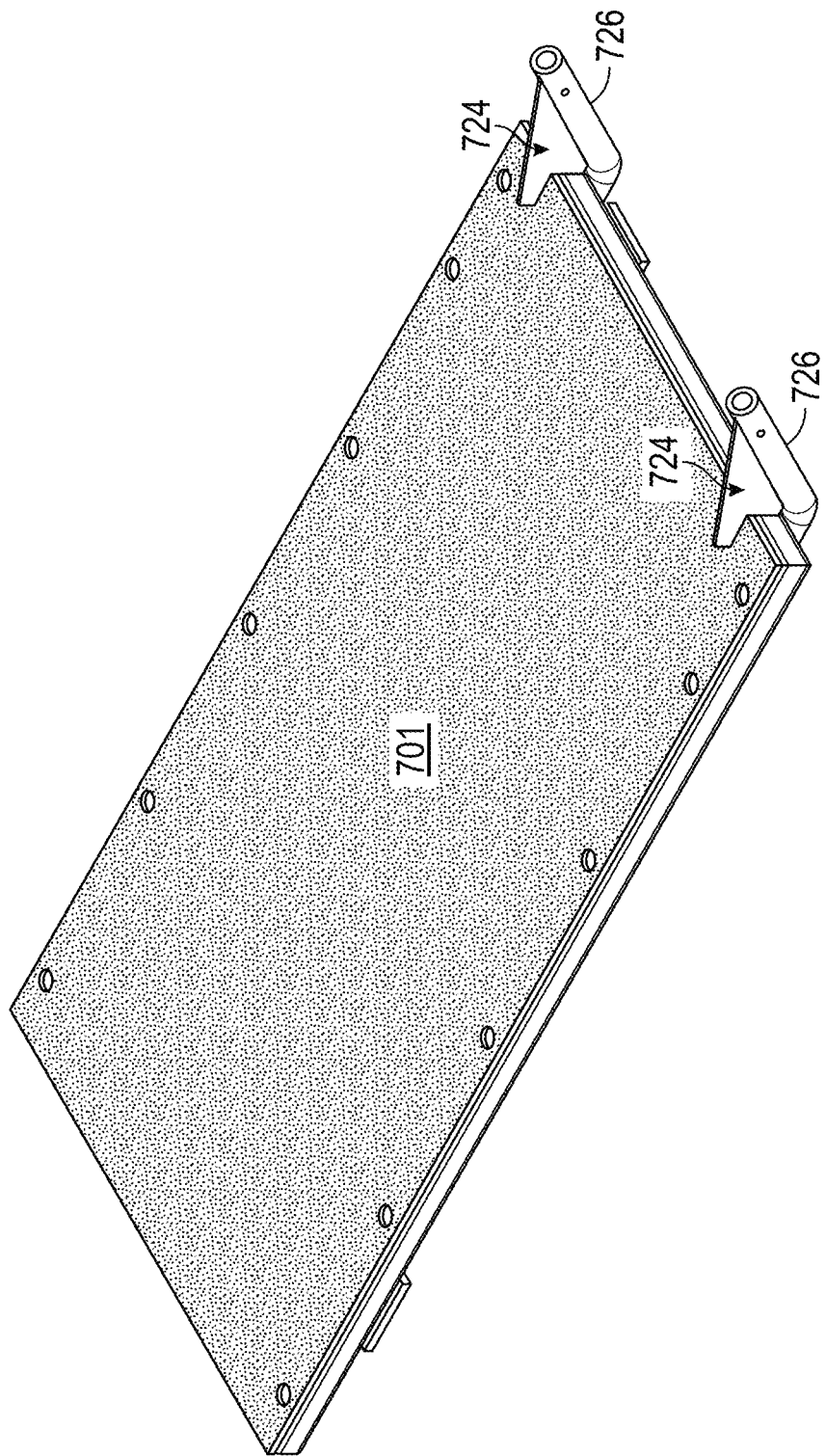

FIG. 7E illustrates a portion of utility cart 700, wherein handle 102a is insertable into a fixture 726. Fixture 726 may also include a reinforcement plate 724 securing fixture 726 to baseboard 701.

Figure 7F:
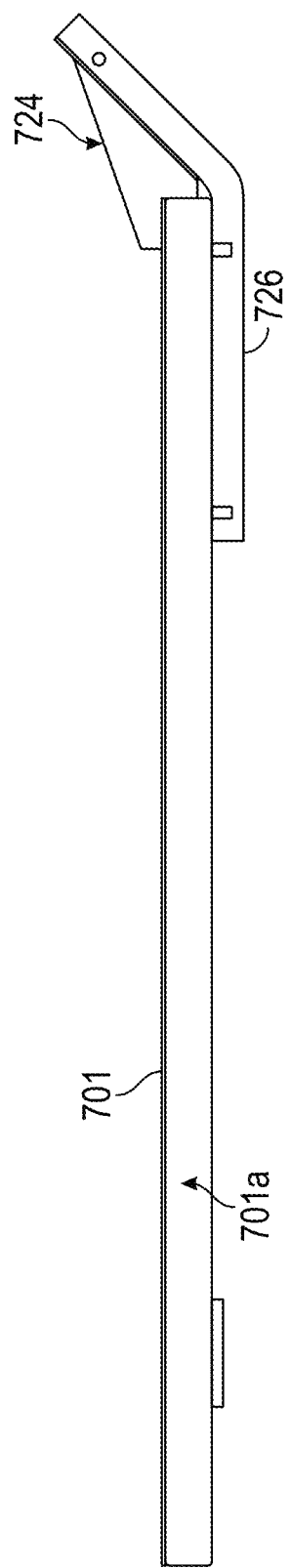

FIG. 7F illustrates a side view of a portion of utility cart 700 including baseboard 701, fixture 726, and reinforcement plate 724. In some embodiments, baseboard 701 includes a flat sheet of material covering a top of rectangular base 701a. Moreover, baseboard 701 may also include a textured safety mat at the top of the flat sheet to avoid slippage of an item for transport on the utility cart.

Further, with respect to the foregoing description, however, it is to be realized that the optimum dimensional relationships for the parts of the disclosure, to include variations in size, materials, shape, form, function, and manner of operation, assembly and use, are deemed readily apparent and obvious to one skilled in the art, and all equivalent relationships to those illustrated in the drawings and described in the specification are intended to be encompassed by the present disclosure.

Those skilled in the art will further appreciate that various components of the foregoing disclosure may be manufactured from any variety of materials well known in the art and suited to the use of the particular component. Embodiments of the disclosure include an optimized combination of such materials.

The foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "include" as "include" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

The invention claimed is:

1. A utility cart comprising:
a rectangular base;
at least one handle extending outward and upwards from a short side of the rectangular base;
a leg extending down from the short side of the rectangular base on the short side of the at least one handle;
a first wheel assembly joined to the rectangular base on end opposite to the at least one handle, wherein two wheels and the leg are positioned such that the rectangular base is horizontal with a floor;
two holes centered along each long side of the rectangular base;
a first adjustable guard that fits into the two holes;
a flat sheet of material covering a top of the rectangular base; and
a textured safety mat at the top of the flat sheet of material to avoid slippage of an item for transport on the utility cart.

2. The utility cart of claim 1, further comprising five paired holes centered along each long side of the rectangular base, wherein two holes are positioned at each corner, one hole is positioned between a short end adjacent to the at least one handle and an adjacent support beam, and two additional holes are placed between adjacent support beams, and wherein the first adjustable guard fits any one of the holes.

3. The utility cart of claim 1, further comprising a second adjustable guard that fits into a second paired set of holes along each long side of the rectangular base.

4. The utility cart of claim 1, further comprising multiple adjustable guards that fit into a multiple pair sets of holes along each long side of the rectangular base, and forming two or more compartments on the rectangular base to carry items on the utility cart.

5. The utility cart of claim 1, further comprising a second wheel assembly extending from the short side in a perpendicular direction relative to the first wheel assembly.

6. The utility cart of claim 1, further comprising a second wheel assembly on a side of the rectangular base proximal to the at least one handle, wherein the second wheel assembly has a narrower axis than the first wheel assembly, the second wheel assembly comprising two steerable wheels.

7. The utility cart of claim 1, further comprising a baseboard forming the rectangular base, the baseboard configured to receive an item for transport on the utility cart.

8. The utility cart of claim 1, wherein the first adjustable guard comprises a frame having two extremities such that each extremity is inserted in each of the holes, and wherein the first adjustable guard comprises a bar joining the two extremities at a point of insertion into the holes.

9. The utility cart of claim 1, wherein the at least one handle is bent up to reach an extended arm of a standup carrier when lifting the utility cart.

10. The utility cart of claim 1, wherein the at least one handle is insertable into a fixture, and the fixture comprises a reinforcement plate securing the fixture to the rectangular base.

11. The utility cart of claim 1, further comprising an axle support to support the first wheel assembly.

12. The utility cart of claim 1, wherein the leg is a curved tube extending from the long side of the rectangular base to another long side of the rectangular base having a concavity pointing downward from the rectangular base.

13. The utility cart of claim 1, further comprising a latch door along a short end of the rectangular base opposite the at least one handle, the latch door configured to open for downloading a charge on the utility cart, upon a user actuation.

14. A flatbed cart, comprising:
a frame to support a planar sheet;
a first wheel assembly attached to the frame, the first wheel assembly comprising an axle, two wheels attached to the axle, and an axle support having an arcuate shape with a concavity pointing down, wherein the axle support is fixed to the frame in two extremities and the axle is attached to the axle support at a low point in the concavity;
a handle attached to the frame, the handle curved upward from the planar sheet to form a handle grip; and
a leg attached to the frame opposite the handle grip, wherein the first wheel assembly comprises a fulcrum when a carrier lifts the handle and a load is placed on the planar sheet, and the leg provides a support for disposing the planar sheet in a horizontal position when the carrier releases the handle, wherein the leg is curved sideways and a lowest point of the leg is aligned with a center of the planar sheet.

15. The flatbed cart of claim 14, further comprising five paired holes centered along each long side of the frame, wherein two holes are positioned at each corner, one hole is positioned between a short end adjacent to the handle and an adjacent support beam, and two additional holes are placed between adjacent support beams, and wherein an adjustable guard fits any one of the holes.

16. The flatbed cart of claim 14, further comprising a second adjustable guard that fits into a second paired set of holes along each long side of the frame.

17. The flatbed cart of claim 14, further comprising multiple adjustable guards that fit into a multiple pair sets of holes along each long side of the frame, and forming two or more compartments on the frame to carry items on the flatbed cart.

18. The flatbed cart of claim 14, further comprising a second wheel assembly extending from a short side in a perpendicular direction relative to the first wheel assembly.

19. The flatbed cart of claim 14, further comprising a second wheel assembly on a side of the frame proximal to the handle, wherein the second wheel assembly has a narrower axis than the first wheel assembly, the second wheel assembly comprising two steerable wheels.

* * * * *